United States Patent [19]

McCartney

[11] 4,376,148
[45] Mar. 8, 1983

[54] IMPREGNATED NON-WOVEN SHEET MATERIAL WITH IONICALLY SOLUBILIZED RESIN

[75] Inventor: John McCartney, Chester County, Pa.

[73] Assignee: Norwood Industries, Inc., Malvern, Pa.

[21] Appl. No.: 188,329

[22] Filed: Sep. 18, 1980

[51] Int. Cl.³ .......................... B05D 5/00; B05D 3/02; B05D 1/18
[52] U.S. Cl. .................................... 428/198; 427/246; 427/342; 427/392; 427/439; 428/220; 428/288; 428/290; 428/904
[58] Field of Search ............... 428/220, 288, 290, 198, 428/904; 427/246, 392, 439, 342

[56] References Cited

U.S. PATENT DOCUMENTS

4,171,391 10/1979 Parker .................................. 428/904

Primary Examiner—Marion McCamish
Attorney, Agent, or Firm—Webb, Burden, Robinson & Webb

[57] ABSTRACT

A resin impregnated fibrous web is comprised of a needled fibrous batt and a polymeric resin distributed throughout the batt. The density of the impregnated web is uniform throughout with the bulk density of the web being less than the actual density of the web whereby the web is porous. The impregnated web has filaments which are both coated and uncoated with the polymeric resin. A method of forming the impregnated fibrous web is also disclosed.

32 Claims, 5 Drawing Figures

IMPREGNATED NON-WOVEN SHEET MATERIAL WITH IONICALLY SOLUBILIZED RESIN

BACKGROUND OF THE INVENTION

1. Field of the Invention

This invention relates to resin impregnated fibrous webs and more particularly to resin impregnated fibrous webs having a uniform density throughout.

2. Description of the Prior Art

Resin impregnated sheet materials such as cloth, batts, waterleaves, and the like are well known in the art. These resin impregnated sheet materials are useful for a plurality of purposes including imatitation leather in the form of vinyls and the like, structural sheet materials such as conveyor belts and similar products.

Prior art methods of impregnating a particular web involve the impregnation or coating of a porous material with a polymeric resins such as a polyurethane, vinyl or a similar material. Polyurethanes have met with wide acceptance as a coating or impregnating composition due to their capability of wide variation in chemical and physical properties, particularly their flexibility and chemical resistance. In impregnating the porous sheet material with a polymeric resin several techniques have been employed. One such prior art method involves the use of the polymeric resin in an organic solvent system wherein the sheet material is dipped in the solution and the solvent is removed therefrom. These solvent systems are undesirable since the solvent, in many cases, is toxic and must either be recovered for reuse or discarded. These solvent systems are expensive and do not necessarily provide a desirable product since upon evaporation of the solvent from the impregnated porous sheet material the resin tends to migrate to provide a non-homogeneous impregnation of the porous sheet material resulting in resin richness toward the surface of the sheet material rather than uniform impregnation.

In order to alleviate the problems with solvent systems, certain aqueous polymeric systems have been proposed. In forming impregnated sheet materials by impregnation with aqueous polymers, the aqueous portion must be removed. Again heat is required and migration of the polymer to the surfaces of the impregnated sheet material is encountered.

In one method of combining polyurethane solutions with porous substrates the polymer is applied in an organic solvent to a substrate, such as a needle punched polyester batt. The polymer-substrate composite is subsequently bathed with a mixture of organic solvent for the polymer and a non-solvent for the polymer that is at least partially miscible with the solvent until the layer is coagulated into a cellular structure of interconnected micropores. The solvent is removed from the coating layer along with the non-solvent to produce a solvent free microporous layer. Although this process yields acceptable properties for a polyurethane impregnated fabric, it has the disadvantage of an organic solvent system particularly when high performance polyurethanes are utilized which require relatively toxic and high boiling solvents. An example of this method is disclosed in U.S. Pat. No. 3,208,875.

In another method, polyurethane dispersions in organic vehicles have been proposed and used to coat porous substrates such as is disclosed in U.S. Pat. No. 3,100,721. In this system, a dispersion is applied to a substrate, and coagulated by further addition of a non-solvent. Although this approach has been used with some success, it involves two major limitations: (1) the vehicle of the dispersion is substantially organic since relatively small amounts of non-solvent, preferably water, are needed to form a dispersion; and (2) there is a narrow useful range of added non-solvent so that reproducible results are difficult to obtain.

One particularly useful method of preparing composite sheet material by impregnating a porous substrate is disclosed in U.S. Pat. No. 4,171,391 incorporated herein by reference. In this system a porous sheet material is impregnated with an aqueous ionic dispersion of a polyurethane and the impregnant is coagulated therein. The composite is then dried to form a composite sheet material. The present invention is an improvement over this basic process and in some instances is broader in scope.

In accordance with the present invention, a method of impregnating porous sheet materials and particularly needled batts is disclosed wherein uniform impregnation is provided in an aqueous system forming a product with high tear strength and integrity.

Further, an impregnated fibrous web is provided which has a novel and unusual useful structure adapted to be used as formed or subsequently processed to provide further advantages.

BRIEF DESCRIPTION OF THE INVENTION

A resin impregnated fibrous web is comprised of a needled fibrous batt and a polymeric resin distributed throughout the batt. The density of the impregnated web is uniform throughout with the bulk density of the web being less than the actual density of the web whereby the web is porous. The impregnated web has filaments which are both coated and uncoated with the polymeric resin. A method of forming the impregnated fibrous web is also disclosed.

DETAILED DESCRIPTION OF THE INVENTION

"Bulk density" as used herein means and refers to the density of the material including air space. "Actual density" as used herein means and refers to the density of the material not including air space, i.e. specific gravity.

The needled fibrous batts useful in the practice of the invention are typically formed of natural and synthetic fibers such as wool, polyester, polypropylene, rayon, nylon and the like. Preferably the fibers have a denier of 1 to 5 and a length which is suitable for carding which is typically one to six inches and more preferably one and one-half to three inches.

The needled fibrous batts can be of both high and low density. The high density batts have a maximum density of 0.5 grams/cc. These high density batts are typically composed of wool. When synthetic fibers are used in forming the batts, the high density batts are up to 0.25 grams/cc. Preferably in the practice of the invention, the fibrous batts have a density 0.08 grams/cc to 0.5 grams/cc. The thickness of the batts may be up to 0.5 inches and preferably between 0.12 inches and 0.4 inches with a minimum thickness of 0.030 inch. Additionally, the batts are characterized as "saturating batts" which have high integrity due to the needle punching operation as opposed to lightly bonded batts having few needle punches with little or no integrity.

The polymeric resins useful in the practice of the invention are preferably those polymeric resins which are capable of solubilization, dispersion, or emulsification in water and subsequent coagulation from the water system with an ionic coagulating agent.

A preferred polymer system is one which is synthesized from acrylic monomers such as the alkyl acrylates and methylacrylates, acrylonitrile, methylacrylonitrile and other well known acrylic monomers. These acrylic monomers may be polymerized by emulsion polymerization to form a latex or by other radical polymerization mechanisms and subsequently solubilized or emulsified in water. The emulsification or solubilizing system must be such that when the emulsion is contacted with concentrated acid or base the polymer coagulates from the aqueous system and is rendered substantially insoluble.

Most preferably, emulsified or aqueously dispersed polyurethanes are utilized. Exemplary of the emulsified polyurethanes are those disclosed in U.S. Pat. No. 2,968,575 prepared and dispersed in water with the aid of detergents under the action of powerful shearing forces. When these polyurethane emulsions are formed, the emulsifying agent or detergent must be one which is ionic in nature so that a counter ion may be added to the aqueous system to coagulate the polymer. Most preferably, the polyurethanes useful in the practice of the invention are those recognized in the art as ionically water dispersible.

The preferred system for preparing ionic aqueous polyurethane dispersions is to prepare polymers that have free acid groups, preferably carboxylic acid groups covalently bonded to the polymer backbone. Neutralization of these carboxyl groups with an amine, preferably a water soluble mono-amine, affords water dilutability. Careful selection of the compound bearing the carboxylic group must be made because isocyanates, necessary components in any polyurethane system, are generally reactive with carboxylic groups. However, as disclosed in U.S. Pat. No. 3,412,054, incorporated herein by reference, 2,2-hydroxymethyl-substituted carboxylic acids can be reacted with organic polyisocyanates without significant reaction between the acid and isocyanate groups due to the stearic hinderance of the carboxyl by the adjacent alkyl groups. This approach provides the desired carboxyl containing polymer with the carboxylic groups being neutralized with the tertiary mono-amine to provide an internal quaternary ammonium salt and hence, water dilutability.

Suitable carboxylic acids and preferably the sterically hindered carboxylic acids, are well known and readily available. For example, they may be prepared from an aldehyde that contains at least two hydrogens in the alpha position which are reacted in the presence of a base with two equivalents of formaldehyde to form a 2,2-hydroxymethyl aldehyde. The aldehyde is then oxidized to the acid by procedures known to those skilled in the art. Such acids are represented by the structural formula, wherein R represents hydrogen, or alkyl of up to 20 carbon atoms, and preferably, up to eight carbon atoms. A preferred acid is 2,2-di-(hydroxymethyl) propionic acid. The polymers with the pendant carboxyl groups are characterized as anionic polyurethane polymers.

Further, in accordance with the present invention, an alternate route to confer water dilutability is to use a cationic polyurethane having pendant amino groups. Such cationic polyurethanes are disclosed in U.S. Pat. No. 4,066,591 incorporated herein by reference, and particularly, in Example XVII. In the context of the present invention it is preferred that the anionic polyurethane be used.

The polyurethanes useful in the practice of the invention more particularly involve the reaction of di- or polyisocyanates and compounds with multiple reactive hydrogens suitable for the preparation of polyurethanes. Such diisocyanates and reactive hydrogen compounds are more fully disclosed in U.S. Pat. Nos. 3,412,034 and 4,046,729. Further, the processes to prepare such polyurethanes are well recognized as exemplified by the aforementioned patents. In accordance with the present invention, aromatic, aliphatic and cyclo-aliphatic diisocyanates or mixtures thereof can be used in forming the polymer. Such diisocyanates, for example, are tolyene-2,4-diisocyanate; tolylene-2,6-diisocyanate; meta-phenylene diisocyanate; biphenylene-4,4'-diisocyanate; methylene-bis(4-phenyl isocyanate); 4-chloro-1,3-phenylene diisocyanate; naphthylene-1,5-diisocyanate; tetramethylene-1,4-diisocyanate; hexamethylene-1,6-diisocyanate; decamethylene-1,10-diisocyanate; cyclohexylene-1,4-diisocyanate; methylene-bis(4-cyclohexyl isocyanate); tetrahydronaphthylene diisocyanate; isophorone diisocyanate and the like. Preferably, the arylene and cyclo-aliphatic diisocyanates are used most advantageously in the practice of the invention.

Characterisitcally, the arylene diisocyanates encompass those in which the isocyanate group is attached to the aromatic ring. The most preferred isocyanates are the 2,4 and 2,6 isomers of tolylene diisocyanate and mixtures thereof, due to their ready availability and their reactivity. Further, the cyclo-aliphatic diisocyanates used most advantageously in the practice of the present invention are 4,4'-methylene-bis(cyclohexyl isocyanate) and isophorone diisocyanate.

Selection of the aromatic or aliphatic diisocyanates is predicated upon the final end use of the particular material. As is well recognized by those skilled in the art, the aromatic isocyanates may be used where the final product is not excessively exposed to ultraviolet radiation which tends to yellow such polymeric compositions; whereas the aliphatic diisocyanates may be more advantageously used in exterior applications and have less tendency to yellow upon exposure to ultraviolet radiation. Although these principles form a general basis for the selection of the particular isocyanate to be used, the aromatic diisocyanates may be further stabilized by well known ultraviolet stabilizers to enhance the final properties of the polyurethane impregnated sheet material. In addition, antioxidants may be added in art recognized levels to improve the characteristics of the final product. Typical antioxidants are the thioethers and phenolic antioxidants such as 4,4'-butylidine bis-meta-cresol and 2,6-ditert-butyl-para-cresol.

The isocyanate is reacted with the multiple reactive hydrogen compounds such as diols, diamines, or triols. In the case of diols or triols, they are typically either polyalkylene ether or polyester polyols. A polyalkylene ether polyol is the preferred active hydrogen containing polymeric material for formulation of the polyurethane. The most useful polyglycols have a molecular weight of 50 to 10,000 and in the context of the present invention, the most preferred is from about 400 to 7,000. Further, the polyether polyols improve flexibility proportionally with the increase in their molecular weight.

Examples of the polyether polyols are, but not limited to, polyethylene ether glycol, polypropylene-ether glycol, polytetramethylene ether glycol, polyhexamethylene ether glycol, polyoctamethylene ether glycol, polydecamethylene ether glycol, polydodecamethylene ether glycol and mixtures thereof. Polyglycols containing several different radicals in the molecular chain, such as, for example, the compound $HO(CH_2OC_2H_4O)_nH$ wherein n is an integer greater than one, can also be used.

The polyol may also be a hydroxy terminated or hydroxy pendant polyester which can be used instead or in combination with the polyalkylene ether glycols. Exemplary of such polyesters are those formed by reacting acids, esters or acid halides with glycols. Suitable glycols are polymethylene glycols such as ethylene, propylene, tetramethylene or decamethylene glycol; substituted methylene glycols such as 2,2-dimethyl-1,3-propane diol, cyclic glycols such as cyclohexanediol and aromatic glycols. Aliphatic glycols are generally preferred when flexibility is desired. These glycols are reacted with aliphatic, cyclo-aliphatic or aromatic dicarboxylic acids or lower alkyl esters or ester forming derivatives to produce relatively low molecular weight polymers, preferably having a melting point of less than about 70° C. and a molecular weight like those indicated for the polyalkylene ether glycols. Acids for preparing such polyesters are, for example, phthalic, maleic, succinic, adipic, suberic, sebacic, terephthalic and hexahydrophthalic acids and the alkyl and halogen substituted derivatives of these acids. In addition, polycaprolactone terminated with hydroxyl groups may also be used.

One particularly useful polyurethane system is the crosslinked polyurethane system which is more fully disclosed in U.S. patent application Ser. No. 947,544, filed Oct. 2, 1978 of Andrea Russiello entitled "Crosslinked Polyurethane Dispersions" incorporated herein by reference.

When used herein, "ionic dispersing agent" means an ionizable acid or base capable of forming a salt with the solubilizing agent. These "ionic dispersing agents" are amines and preferably water soluble amines such as triethylamine, tripropylamine, N-ethyl piperidine, and the like; also, acid and preferably water soluble acids such as acetic, propionic, lactic, and the like. Naturally, an acid or amine will be selected contingent on the solubilizing group pendant on the polymer chain.

The desired elastomeric behavior would generally require about 25–80% by weight of long chain polyol (i.e. 700 to 2,000 eq. wt.) in the polymer. The degree of elongation and elasticity may vary widely from product to product depending upon the desired properties of the final product.

In forming the polyurethanes useful in the practice of the invention, the polyol and a molar excess of diisocyanate are reacted to form isocyanate terminated polymer. Although suitable reaction conditions and reaction times and temperatures are variable within the context of the particular isocyanate and polyol utilized, those skilled in the art well recognize these variations. Such skilled artisans recognize that reactivity of the ingredients involved requires the balance of reaction rate with undesirable secondary reactions leading to color and molecular weight degradation. Typically, the reaction is carried out with stirring at about 50° C. to about 120° C. for about one to four hours. To provide pendant carboxyl groups the isocyanate terminated polymer is reacted with a molar deficiency of dihydroxy acid, for one to four hours at 50° C. to 120° C. to form isocyanate terminated prepolymer. The acid is desirably added as a solution, for example, in N-methyl-1,2-pyrrolidone or N-N-dimethylformamide. The solvent for the acid will typically be no more than about 5% of the total charge in order to minimize the organic solvent concentration in the polyurethane composition. After the dihydroxy acid is reacted into the polymer chain, the pendant carboxyl groups are neutralized with an amine at about 58°–75° C. for about twenty minutes and chain extension and dispersion are accomplished by addition to water with stirring. A water soluble diamine may be added to the water as an additional chain extender. The chain extension involves the reaction of the remaining isocyanate groups with water to form urea groups and further polymerize the polymeric material with the result that all the isocyanate groups are reacted by virtue of the addition to a large stoichiometric excess of water. It is to be noted that the polyurethanes of the invention are thermoplastic in nature, i.e. not capable of extensive further curing after formation except by the addition of an external curing agent. Preferably, no such curing agent is added to form the composite sheet material.

Sufficient water is used to disperse the polyurethane at a concentration of about 10–40% by weight solids and a dispersion viscosity in the range of 10–1,000 centipoise. Viscosity may be adjusted in accordance with the particular impregnation properties desired and by the particular dispersion composition which are all dictated by the final product characteristics. It should be noted that no emulsifiers or thickeners are required for the stability of the dispersions.

Those of ordinary skill in the art recognize ways to modify the primary polyurethane dispersion according to end product uses, for example, by the addition of coloring agents, compatible vinyl polymer dispersions, ultraviolet filtering compounds, stabilizers against oxidation and the like.

The characterization of the dispersions prepared in accordance with the invention is done by measurements of non-volatile content, particle size, viscosity measurements and by stress strain properties on strips of cast film.

The concentration range useful in the practice of the invention is governed by the desirable percent add on of polymer into the needled batt.

The dispersion viscosity is generally in the range from 10–1,000 centipoise. The low viscosity, relative to that of identical polymers at the same solids level in organic solvent polymer solutions, assists rapid and complete penetration of the aqueous dispersion and subsequent penetration of the coagulant. Useful solutions of polyurethanes will, in contast, generally have viscosities of several thousand centipoise, ranging as high as 50,000 centipoise at concentrations of 20–30%.

The polymers should be impregnated into the fibrous batt at a level of at least 70 percent by weight add on based upon the weight of the fibrous batt and up to about 400 percent by weight. Preferably, the polymeric resin is impregnated at a level of about 200 to 300 percent by weight add on based upon the weight of the fibrous batt.

Coagulation is accomplished by contacting the impregnated substrate with an aqueous solution of an ionic media designed to ionically replace the solubilizing ion. In theory, although not intended to be bound by such theory, in the case of an anionically solubilized polymer, the amine which neutralizes the carboxyl containing polyurethane is replaced with a hydrogen ion which reverts the anionic carboxyl ion thus reverting the polymer to its original, "non-dilutable" condition. This causes coagulation of the polymer within the substrate structure.

In the case of the anionic polymer, aqueous acetic acid solutions at concentrations of 0.5% to about 75% are suitable ionic coagulant for the anionic dispersions and are preferred over stronger acids because of the relative ease of handling, low corrosion potential and disposibility.

"Salting out" to coagulate the dispersion by the addition of the neutral salt is feasible but is not favored because of the large amounts of salt needed, about 10 times the concentration of acid, and attendant problems of product contamination.

In impregnating the needled batt with the polymeric resin as contemplated herein, the batt is immersed in a aqueous ionic emulsion or dispersion at a concentration level sufficient to provide an add on of at least 70 percent by weight. Upon immersion of the batt in the aqueous emulsion or dispersion, the batt may be squeezed to remove air to provide full impregnation of the emulsion or dispersion within the batt. The batt, now fully impregnated with the aqueous dispersion or emulsion, is passed through wiping rolls or the like to remove excess dispersion or emulsion on the surface of the impregnated batt. The batt is then immersed in a bath containing the counter ion to provide coagulation with the counter ion containing material permeating the batt through diffusion and providing coagulation of the resin within the fibrous structure. After coagulation, the batt is squeezed to remove excess water and dried to form the impregnated web.

This process is a further improvement over the process described in U.S. Pat. No. 4,171,391 in respect of providing particular products. The differences between the referenced patent and the present process is that the batt is fully saturated i.e., no retained air space with the aqueous dispersion or emulsion providing an ultimate add on of at least 70 percent by weight of polymeric resin based upon the weight of the batt. Because of these differences, a novel structure is obtained wherein the batt has a uniform density throughout and the bulk density of the web is less than the actual density of the web. This structure is more fully shown in the accompanying drawings which are photomicrographs of cross sections of an impregnated web prepared in accordance with the invention.

DETAILED DESCRIPTION OF THE DRAWINGS

Figure 1:
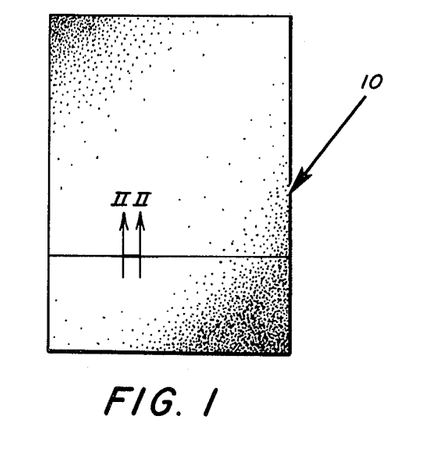
FIG. 1 is a plan view of the resin impregnated web prepared in accordance with Example 1 prior or splitting.
Figure 2:
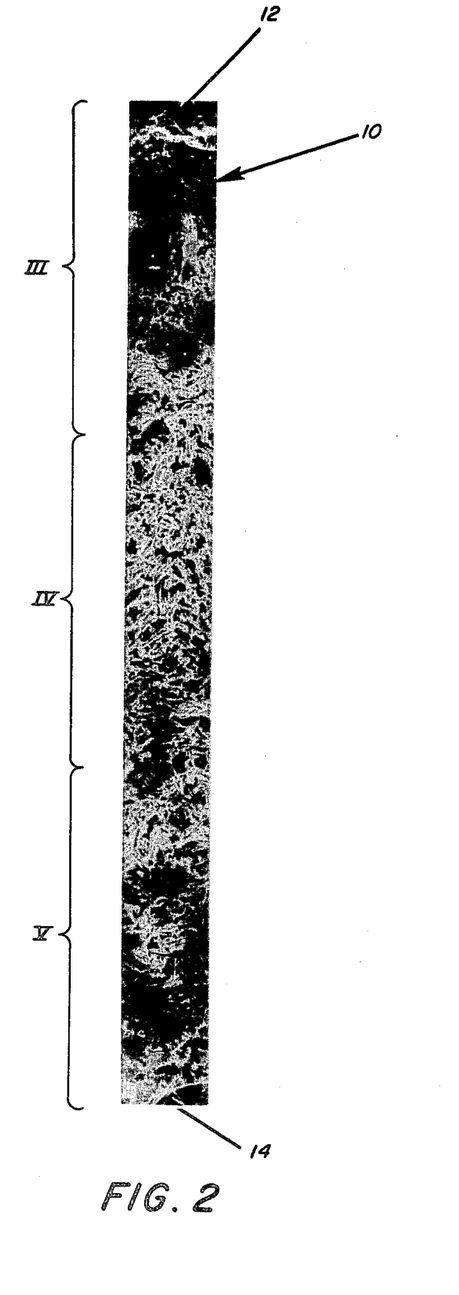
FIG. 2 is a photomicrograph taken through the thickness of the web of FIG. 1 through the II—II line.
Figure 3:
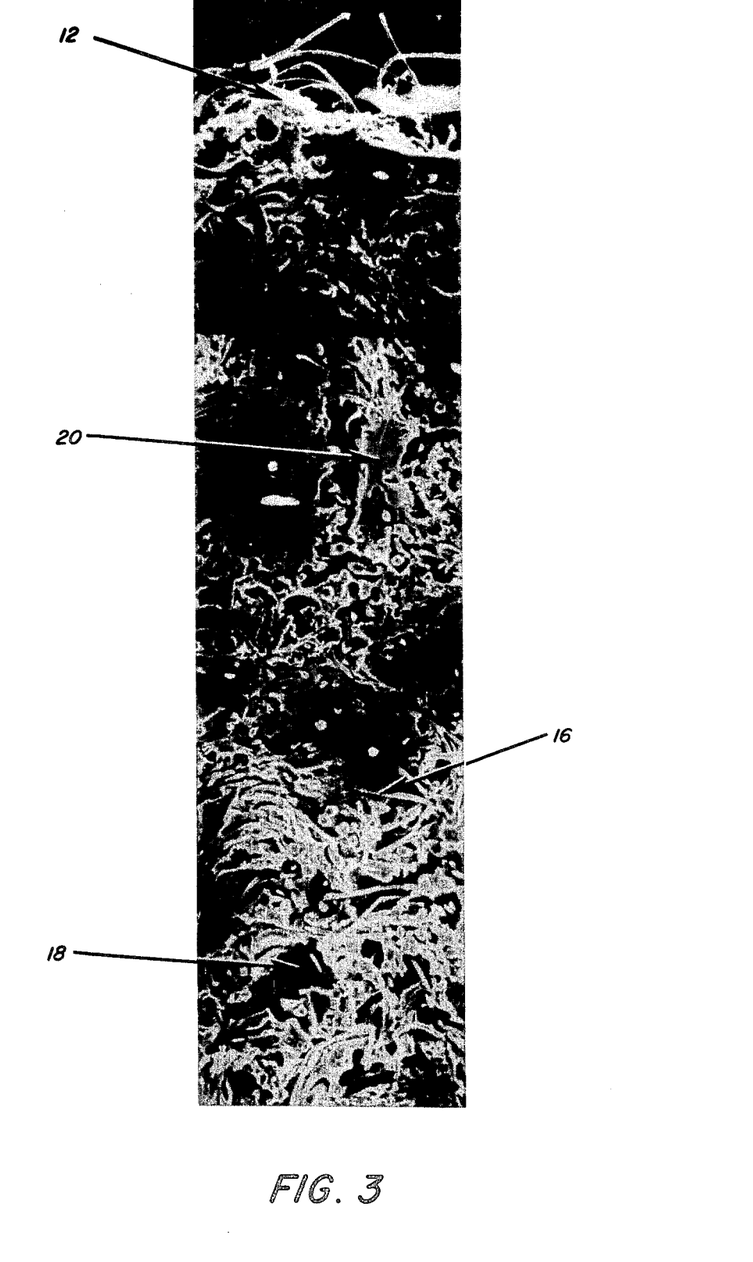
FIG. 3 is a 100 x photomicrograph of the III section of FIG. 2.
Figure 4:
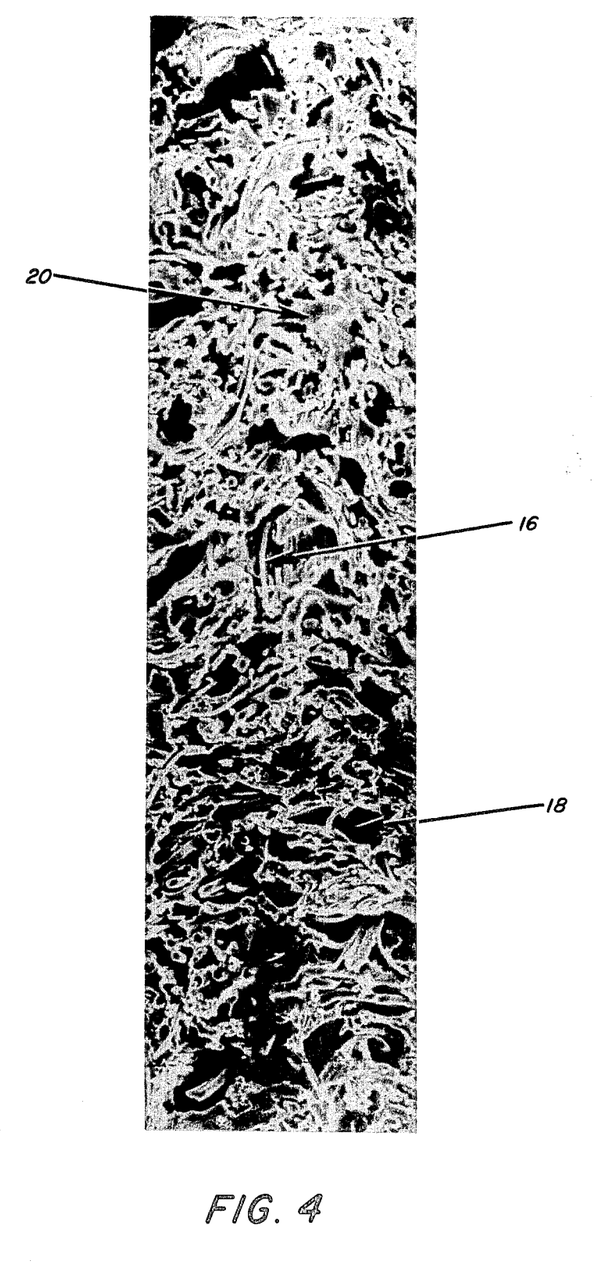
FIG. 4 is a 100 x photomicrograph of the IV section of FIG. 2.
Figure 5:
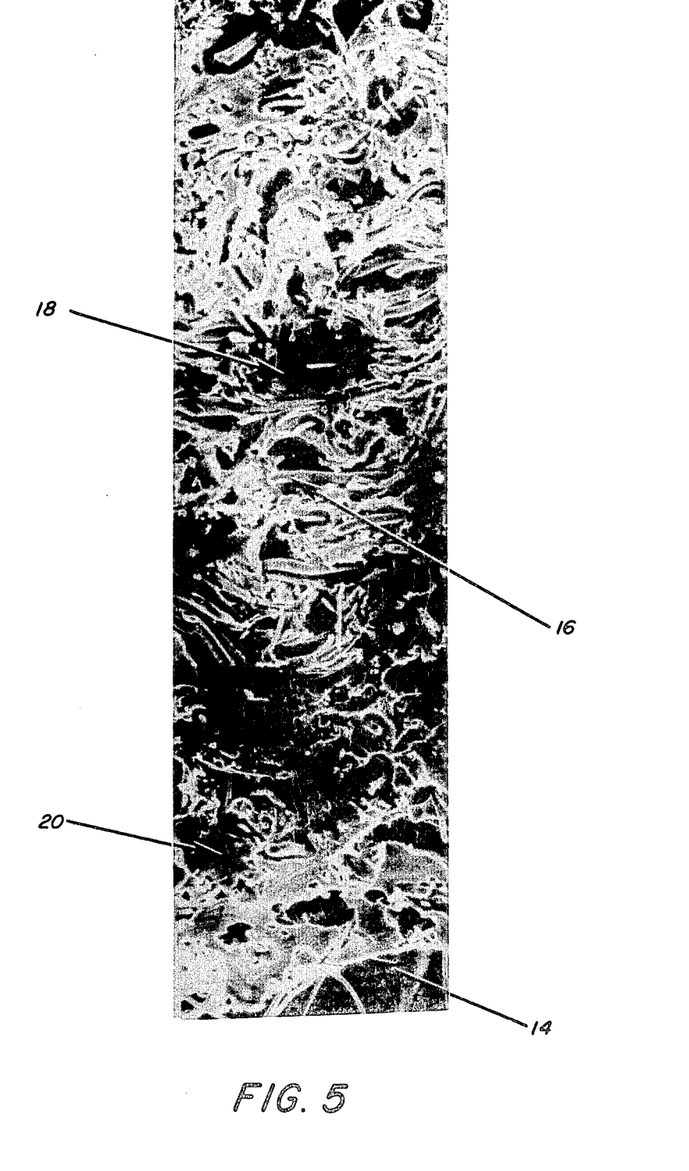
FIG. 5 is a 100 x photomicrograph of the V section of FIG. 2.

Referring now to FIGS. 1 through 5, wherein like reference numerals refer to like parts there is shown a resin impregnated web 10 prepared in accordance with Example 1. More particularly, FIGS. 2-5 show a cross section through the thickness of the web 10. The web 10 is composed of a top surface 12 and a bottom surface 14. Throughout the web 10 there are a substantial number of uncoated fibers 16, concentrations of resin 20, voids 18 and resin coated fibers 22. The structure and hence its bulk density is substantially uniform throughout the thickness of the material, although on a microscopic scale, the structure is non-homogeneous.

The structure shown in FIGS. 2-5 is believed to be attributable to the full impregnation of the needled batt with the aqueous emulsion or dispersion with subsequent coagulation of the polymer while the batt is fully impregnated with the aqueous resin system.

The following examples are illustrative of the products prepared in accordance with the invention.

EXAMPLE I

A needled batt which was heat set and had a density of 1,200 grams/sq. meter composed of polyester, polypropylene and rayon fibers and a thickness of 0.3 inches with a bulk density of 0.16 grams/cm$^3$ was immersed in a polyurethane prepared in accordance with Example III of U.S. patent application Ser. No. 947,544 of Andrea Russiello previously cited herein. The polymeric dispersion had a 22% total solids content to provide an add on of 120% based upon the weight of the batt. The batt was immersed in the polyurethane dispersion for 10 minutes at room temperature until all of the air was expelled from within the batt and the batt was fully impregnated. The surface of the batt was wiped with a straight edge on both sides to remove excess aqueous dispersion and immersed in a 10% acetic acid bath for 10 minutes at room temperature. Immersion in the acid completely coagulated the polyurethane within the fiber structure. The excess acetic acid was washed from the batt and the resin impregnated batt was squeezed to remove excess water. The resin impregnated batt was split into four slices through its thickness and each split was dried at 300° F. in a circulating air oven to form four resin impregnated webs having a bulk density of 0.41 g/cc. The final product had a photomicrograph as shown in

EXAMPLE II

Example I was repeated except that a 100% polyester batt having a density of 0.13 grams/cc and 0.2 inches thick was impregnated with 22% solids dispersion of Example I. The resulting impregnated web had a uniform density throughout, high integrity and a bulk density of 0.38 grams/cm$^3$.

EXAMPLE III

Example I was repeated except that a 100% polyester needled batt of 0.22 inch thickness and a density of 0.23 grams/cc was impregnated with 32% solids dispersion to form a needled impregnated resin fibrous web having a bulk density of 0.56 grams/cm$^3$. The product in accordance with Example III was used as a polishing pad and had toughness, high tear strength, resilience and complete recovery upon compression.

Thus the process and product in accordance with the invention provides an impregnated fibrous web of high integrity and useful as a product in and of itself and useful in forming other products. Further, the impregnated fibrous web may be buffed to provide a desirable finish.

Although the invention has been described with reference to particular materials and particular processes, the invention is only to be limited so far as is set forth in the accompanying claims.

I claim:

1. A resin impregnated fibrous web comprised of:
   a needled fibrous batt;
   a polymeric resin distributed throughout said batt forming a resin impregnated fibrous web;
   the density of said impregnated fibrous web being uniform throughout;
   the bulk density of said web being less than the actual density of said web, whereby the web is porous; and
   said impregnated web having filaments which are both coated and uncoated with polymeric resin and concentrations of polymeric resin.

2. The resin impregnated fibrous web of claim 1 wherein said needled fibrous batt has a bulk density of less than 0.5 grams/cm$^3$.

3. The resin impregnated fibrous web of claim 2 wherein said needled fibrous batt has a bulk density of less than 0.25 grams/cm$^3$.

4. The resin impregnated fibrous web of claim 2 wherein said needled fibrous batt has a bulk density of between about 0.12 to about 0.4 grams/cm$^3$.

5. The resin impregnated fibrous web of claim 1 wherein said needled fibrous batt has a thickness of at least 30 mils.

6. The resin impregnated fibrous web of claim 1 wherein said needled fibrous batt is composed of substantially non-fusible fibers.

7. The resin impregnated fibrous web of claim 1 wherein said polymeric resin is a polyurethane.

8. The resin impregnated fibrous web of claim 7 wherein said polyurethane is water dispersible polyurethane.

9. The resin impregnated fibrous web of claim 7 wherein said polyurethane is a crosslinked polyurethane.

10. The resin impregnated fibrous web of claim 1 wherein said polymeric resin is a polyacrylate.

11. The resin impregnated fibrous web of claim 1 wherein said polymeric resin is present at a level of at least 70 percent by weight add on based upon the weight of the fibrous batt.

12. The resin impregnated fibrous web of claim 11 wherein said polymeric resin is present at a level of less than about 400 percent by weight add on based upon the weight of the fibrous batt.

13. The resin impregnated fibrous web of claim 12 wherein said polymeric resin is present at a level of about 200 to 300 percent by weight add on based upon the weight of the fibrous batt.

14. The resin impregnated fibrous web of claim 1 having a density of up to about 0.75 g/cc.

15. The resin impregnated fibrous web of claim 14 having a density of between about 0.4 to about 0.75 g/cc.

16. A method of forming an impregnated fibrous web comprising:
    fully saturating a needled fibrous batt with an aqueous dispersion or emulsion of a polymeric resin;
    contacting the fully saturated needled batt with a coagulating agent to coagulate the polymeric resin from the aqueous dispersion and deposit the polymeric resin within said needled batt; and,
    drying the needled batt and polymeric resin to form an impregnated fibrous web having a uniform density throughout.

17. The method of claim 16 wherein said needled batt has a bulk density of less than 0.5 grams/cc.

18. The method of claim 17 wherein said needled fibrous batt has a bulk density of less than 0.25 grams/cm$^3$.

19. The method of claim 17 wherein said needled fibrous batt has a bulk density of between about 0.12 and 0.4 grams/cm$^3$.

20. The method of claim 16 wherein said needled fibrous batt has a thickness of at least 30 mils.

21. The method of claim 16 wherein said needled fibrous batt is composed of substantially non-fusible fibers.

22. The method of claim 16 wherein said polymeric resin is a polyurethane.

23. The method of claim 22 wherein said polyurethane is crosslinked.

24. The method of claim 16 wherein said aqueous dispersion or emulsion has a solids content of about 5 to 60 percent by weight.

25. The method of claim 16 wherein said polymeric resin is present in said web at a level of at least 70 percent by weight add on based upon the weight of the fibrous batt.

26. The method of claim 25 wherein said polymeric resin is present at a level of less than about 400 percent by weight add on based upon the weight of said fibers.

27. The method of claim 26 wherein said polymeric resin is present at a level of about 200 to 300 percent by weight add on based upon the weight of said fibrous batt.

28. The method of claim 16 wherein said impregnated fibrous web has a density of up to about 0.75 g/cc.

29. The method of claim 28 wherein said impregnated fibrous web has a density of between about 0.4 to about 0.75 g/cc.

30. The product produced according to the process of claim 16.

31. The method of claim 16 wherein said polymeric resin is ionically solubilized.

32. The method of claim 16 wherein said coagulating agent is ionic.

* * * * *

UNITED STATES PATENT AND TRADEMARK OFFICE
CERTIFICATE OF CORRECTION

PATENT NO. : 4,376,148
DATED : March 8, 1983
INVENTOR(S) : John McCartney

It is certified that error appears in the above-identified patent and that said Letters Patent are hereby corrected as shown below:

Column 8 Line 47

After "300°" insert -- to 350°--.

Signed and Sealed this

Twenty-fourth Day of May 1983

[SEAL]

Attest:

DONALD J. QUIGG

Attesting Officer     Acting Commissioner of Patents and Trademarks